Jan. 10, 1928.

H. E. MAYNARD 1,655,968

PISTON

Filed Jan. 3, 1921

Inventor
Howard E. Maynard

By
Attorneys

Patented Jan. 10, 1928.

1,655,968

UNITED STATES PATENT OFFICE.

HOWARD E. MAYNARD, OF DETROIT, MICHIGAN, ASSIGNOR, BY DIRECT AND MESNE ASSIGNMENTS, OF ONE-HALF TO CHRYSLER CORPORATION, OF HIGHLAND PARK, MICHIGAN, A CORPORATION OF DELAWARE, AND ONE-HALF TO ALUMINUM COMPANY OF AMERICA, OF PITTSBURGH, PENNSYLVANIA, A CORPORATION OF PENNSYLVANIA.

PISTON.

Application filed January 3, 1921. Serial No. 434,467.

The invention relates to pistons designed for use in internal combustion engines and has for its object the prevention of "pumping" of oil and the "freezing" due to excessive expansion. In the present state of the art it is usual to construct pistons with a cylindrical ring portion having a relatively large clearance with reference to the diameter of the cylinder, and a skirt portion more closely fitting the same and which holds the piston in proper alignment and prevents side slapping. To avoid sticking or freezing of this skirt, due to expansion, certain constructions of pistons have provided the skirt with a longitudinal slot therein to compensate for expansion, but there is one serious difficulty with all such constructions, viz, the tendency for the lubricating oil to work up beyond the skirt and rings and into the explosion chamber. This results in the formation of carbon and other difficulties incident thereto. With the present invention I have overcome this difficulty by arranging between the cylindrical ring portion and the skirt portion a continuous annular groove. This will receive the oil creeping past the skirt and permitting the same to drop back in the cylinder without providing any bridge for its passage to the ring portion. The result is that the cylinder will be fully lubricated, while the excess of lubricant will be scraped off by the lowermost piston rings into the annular groove, where it is permitted to drop back into the cylinder.

Figure 2:
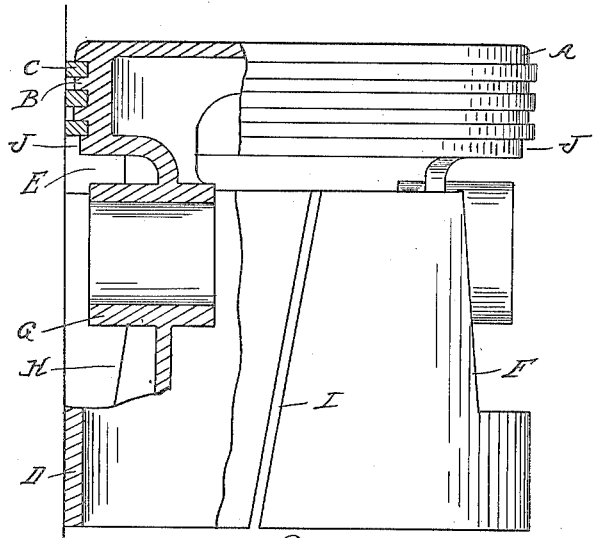
Figure 2 is a transverse section thereof.
Figure 3:
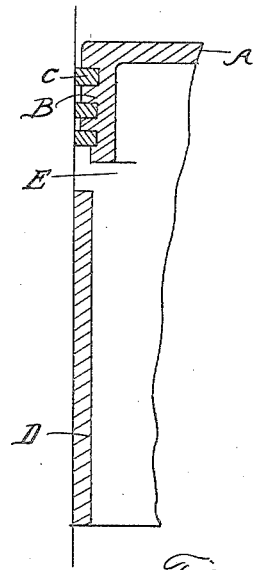
Figure 3 is a similar view in plane at right angles to Figure 2.
Figure 1:
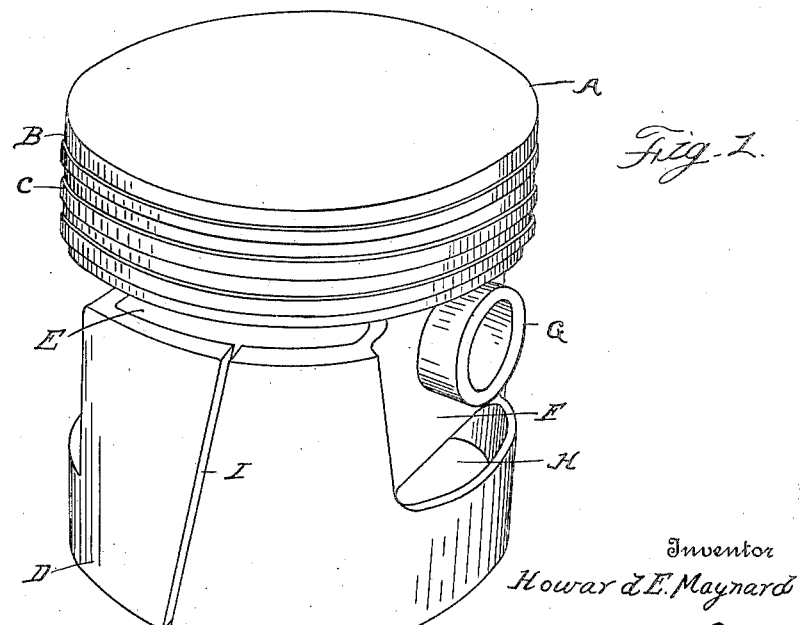
Figure 1 is a perspective view of my improved construction.

A is the piston head having a depending cylindrical portion B grooved to receive the rings C and of a diameter to afford abundant clearance within the engine cylinder. D is a skirt, which is preferably of a diameter to closely fit the cylinder. This skirt is itself discontinuous with the cylindrical portion B of the piston, being separated therefrom by a groove E, which extends completely around the same. The connection between the two parts is formed by webs F on diametrically opposite sides of the piston, said webs extending inward from the portion B and vertically downward and having formed integral therewith the bearings G for the wrist pin. These webs are connected to the skirt on their opposite vertical edges, but are not connected thereto either at top or bottom. Thus there are formed the recesses H surrounding the bearings G with segmental skirt portions on opposite sides thereof and an annular skirt portion below said segmental skirt portions. One of the sides of the skirt between the points of attachment of the webs thereto is longitudinally slitted, as indicated at I, and this slit compensates for expansion and permits the skirt to conform itself to the cylinder.

With the construction as described, when the piston is in operation, the lubricant upon the wall of the cylinder is spread by the skirt portion of the piston and will be forced upward to the groove E at the upper end of the skirt. Further creeping is prevented by this groove and when the accumulation of oil is sufficient, it will drop back inside of the skirt. At no time is there a body of the oil adjacent to the piston rings and for this reason when the engine is upon suction stroke, any leakage past the ring cannot draw oil upward. As a further safeguard, the cylindrical portion B below the lowermost of the ring C is cut away to provide a further clearance, as indicated at J, this clearance being sufficient to prevent the bridging of the oil thereacross. Thus on each downward stroke of the piston, the lowermost ring will scrape all surplus oil from the surface of the cylinder and in the upward stroke the oil thus accumulated will pass through the groove E and downward. Any oil accumulating in the recesses H will follow down the webs F and there is no chance at any point for the accumulation of oil adjacent to the rings.

What I claim as my invention is:

1. A piston comprising a head having a cylindrical ring portion depending therefrom and a skirt portion arranged beneath said ring portion and separated therefrom by a continuous annular groove, said skirt having a pair of spaced segmental portions, webs on diametrically opposite sides of the piston, extending inward from said cylindrical portion and vertically downward, the opposite edges of said webs being connected to the said segmental portions of the skirt, and said skirt having an annular portion below said segmental portions disconnected from the lower ends of said web.

2. A piston comprising a head having a depending cylindrical ring portion of relatively large clearance with respect to the diameter of the cylinder, and a skirt portion below said ring portion closely fitting said cylinder and separated from the ring portion by a continuous annular groove, webs on diametrically opposite sides of said piston extending inward from said cylindrical portion and downward parallel to each other, the opposite vertical edges of said webs being connected to the skirt, said skirt having an annular portion below said webs disconnected from the lower ends of said webs and there being also provided a slit completely through the skirt from the lower to the upper end thereof, and wrist pin bearings carried by said webs.

3. A piston comprising a head, a cylindrical skirt beneath said head having recesses in diametrically opposite sides thereof, parallel webs extending downwardly from said head and having the opposite side edges thereof connected to the side edges of the recesses in said skirt, separating openings being provided between the lower ends of said webs and said skirt and between the upper edges of said skirt and said head, and wrist pin bearings carried by said webs.

4. A piston comprising a head having a depending cylindrical portion provided with annular grooves, rings engaging said grooves, the cylindrical portion below the lowermost ring being cut away, a cylindrical skirt beneath the cylindrical portion of said head and having recesses in diametrically opposite sides thereof, webs extending downwardly from said head and having the opposite side edges thereof connected to the side edges of the recesses in said skirt, separating openings being provided between the lower ends of said webs and said skirt, and wrist pin bearings carried by said webs, one side of said skirt between the points of attachment of said webs thereto being slit longitudinally.

5. A piston comprising a head, a cylindrical skirt beneath said head, parallel webs extending downwardly from said head and connected to said skirt separating recesses being provided between the lower ends of said webs and said skirt and between the upper ends of said skirt and said head, one side of said skirt between the points of attachment of said webs thereto being slitted longitudinally, and wrist pin bearings carried by said webs.

6. In a piston for an internal combustion engine, the combination of a head, a plurality of webs integral with said head and having oppositely disposed wrist pin bosses mounted one in each web, a skirt integral with said webs relieved adjacent said webs to a point between the bosses and the end of the skirt, said piston being provided with circumferential slots between the piston head and skirt and with a longitudinal slot connecting the open end of the skirt with one of the circumferential slots.

7. In a piston for an internal combustion engine, the combination of a head and a plurality of webs integral with said head, diametrically oppositely disposed wrist pin bosses, one mounted in each of said webs and integral therewith, a skirt integral with said webs, relieved adjacent said webs, said relieved portion terminating between the bosses and the end of the skirt, said piston being provided with circumferential slots between the piston head and skirt, with a longitudinal slot connecting the end of the skirt with one of said circumferential slots, and with other circumferential slots between the end of the webs and the open end of the skirt.

8. In a piston for an internal combustion engine, the combination of a head provided with a disc portion and a flange portion and with ring grooves in the flange portion, a pair of substantially rectangular shaped webs integral with and depending from the flange portion of the head, a pair of oppositely disposed wrist pin bosses mounted one in each of said webs, a cross rib in said head and integral with the disc portion and flanges of the head and with said web and piston pin bosses, a skirt for said piston extending below said webs and integrally connected to the side edges of each of said webs, said piston being provided with circumferential slots between the skirt and head, with a longitudinal slot connecting one of said circumferential slots with the bottom edge of the skirt and with circumferential slots between the lower edges of the webs and the adjacent portion of the skirt.

9. A piston for an internal combustion engine, comprising a head, oppositely disposed walls depending from and connected at their upper ends to the head, bosses carried by the said walls out of direct contact with the head, and a skirt structure including two oppositely disposed bearing portions joined together by extensions below each of the said bosses and indirectly connected to the head by the said walls, the skirt structure being separated, by air gaps, from the head at its upper edge, and from the said walls below the bosses.

10. A piston for an internal combustion engine comprising a head, oppositely disposed walls depending from and connected at their upper ends to the head, the walls being depressed within the maximum diameter of the piston, bosses carried by the said walls out of direct contact with the head, and a skirt structure, including two oppositely disposed bearing portions joined together by extensions below each of the said bosses and indirectly connected to the head by the said walls, the skirt structure being separated, by air gaps, from the head at its upper edge, and from the said walls below the bosses.

11. A piston for an internal combustion engine comprising an integral head and skirt, the said skirt consisting of oppositely disposed cylinder engaging bearing walls separated from the head by circumferential slots, a slot extending lengthwise of one of the said bearing walls, depressed walls connecting the said bearing walls, and other cylinder engaging walls connecting the first said bearing walls and separated from the said depressed walls by circumferential slots.

In testimony whereof I affix my signature.

HOWARD E. MAYNARD.